Jan. 22, 1935.  H. FINK ET AL  1,989,005
SOLUTIONS OF FIBROIN
Filed Dec. 3, 1930
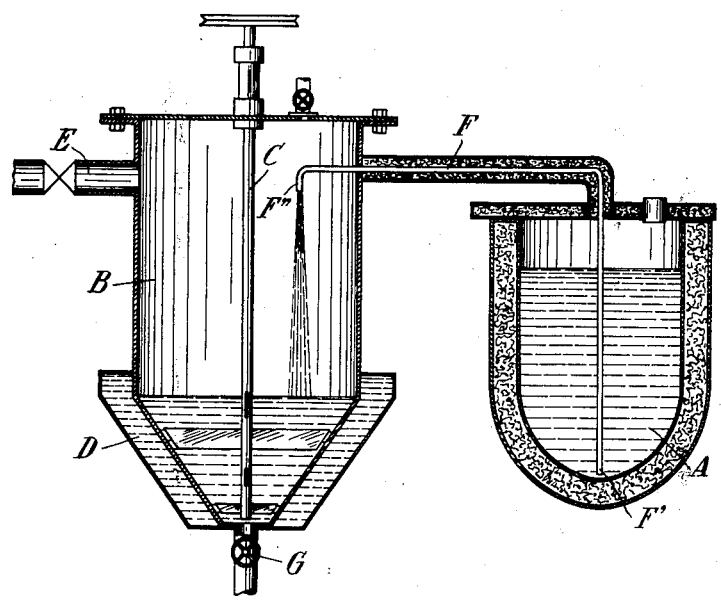

Patented Jan. 22, 1935

1,989,005

UNITED STATES PATENT OFFICE 1,989,005

SOLUTIONS OF FIBROIN

Heinrich Fink and Ernst Rossner, Premnitz, Germany, assignors to I. G. Farbenindustrie Aktiengesellschaft, Frankfort-on-the-Main, Germany Application December 3, 1930, Serial No. 499,839
In Germany December 23, 1929

11 Claims. (Cl. 134—1)

Our present invention relates to the production of solutions of fibroin.

One of its objects is a process for manufacturing an aqueous solution of fibroin practically free from electrolytes.

Additional objects are the new aqueous solutions of fibroin.

Further objects of our invention will be seen from the detailed specification following hereafter.

We have found that a solution of fibroin in anhydrous liquid ammonia, preferably cooled to a temperature near the freezing point of ammonia, is easily transformed into an aqueous fibroin solution which practically contains no electrolytes. The ammoniacal fibroin solution can be passed into water without causing a precipitation, nor does any precipitation occur, even when the ammonia is entirely removed from the aqueous solution. The ammonia used in the first stage as a solvent, can be recovered without loss in the known manner.

As a first starting material we prefer the waste of natural silk produced by the mulberry silkworm *Bombyx mori*, in the form of breeding or faulty cocoons, or the outer floss of the cocoon degummed or not degummed, the comber or other waste left in the silk industry.

In order to carry out our new process successfully, certain precautions must be observed.

The genuine mulberry silk waste has to be freed as far as possible from the mucoidine and the silk gum. Even when starting from natural silk sufficiently scoured for textile purposes, we prefer to subject the silk to a further degumming process, as the degree of scouring required by the textile industry in some cases is not sufficient to guarantee a smooth solubility of the fibroin in liquid ammonia. For the said purpose and for scouring the genuine silk, we may employ the well known scouring processes as, for instance, boiling the silk with a soap solution and/or a slight soda solution or with an aqueous solution containing triethanolamine, or by subjecting the silk to the action of ferments dissolving the silk gum. We prefer to include with the degumming process a treatment with a compound of acid reaction, such as a bath containing a mineral or an organic acid solution. When boiling the silk with an acetic acid of about 1½–3 per cent strength, it is not necessary to completely wash out the acid adhering to the fibers; the latter may be dried after centrifuging without washing.

When dissolving the carefully scoured silk waste consisting nearly quantitatively of fibroin, the temperature of the liquid ammonia serving as a solvent, is of considerable importance. Whereas ammonia at from −46 to −48° C., for instance, dissolves only 10 to 20 per cent of the degummed silk waste in about 3 hours, ammonia dissolves the fibroin entirely in 3 minutes at −77° C.

Solutions of fibroin in liquid ammonia prepared at a low temperature, gelatinize completely in a closed vessel at ordinary temperature, but become liquid again on being cooled. Solutions containing up to 25 per cent of fibroin are thus obtainable when maintaining a dissolving temperature lower than −70° C. These solutions may be concentrated by partly evaporating the ammonia. When carrying out the evaporation while thoroughly stirring the solution, the latter becomes strongly viscous without separation of fibroin and, finally, gelatinizes. A further concentration of the gelatinized solution is connected with difficulties, since the viscosity of the gel does not allow a uniform mixing, so that a film is formed on the surface of the gel causing heterogeneity of the product.

It may be mentioned that the temperature of the liquid ammonia serving as a solvent, may be raised when dissolving fibroin precipitated from a solution in a known solvent such as a strong mineral acid. It is possible to obtain solutions of fibroin of higher concentration and of a diminished viscosity when using a starting material which partly is decomposed by the degumming process. These solutions, however, are not so valuable for spinning silk threads, as the threads obtained show a diminished tenacity. They may be worked up for other purposes, for instance, for sizing, dressing or other preparations.

The ammonia solution of fibroin obtainable according to the conditions mentioned above, can be converted into an aqueous solution simply by running the ammonia solution into water and stirring at the same time, only such a proportion of water being used as corresponds with the desired concentration of fibroin. It is likewise possible to proceed in a reverse manner and allow the water to run into the ammoniacal solution. It is of advantage to spray the ammonia solution through a nozzle so as to produce a fine state of subdivision and to allow the spray to fall through a considerable space of a gas before it arrives at the surface of the water. The bulk of the ammonia is thus recovered at once in the gaseous form, without having to expel it from the aqueous solution. The removal of the ammonia need not be carried to an extreme limit, because the presence of small quantities of ammonia does not interfere with the utilization of the solution. In some cases, the stability of the solution is increased when an amount of ammonia up to 1 per cent is present in the aqueous solution.

In order to obtain a stable aqueous solution of fibroin yielding, for instance, spun products of excellent qualities, it is necessary to lower the concentration of the ammonia during the phase, where an aqueous ammoniacal fibroin solution is present and to expel the bulk of ammonia as soon as possible. When spraying the ammoniacal fibroin solution upon a water surface, as mentioned above, the ammonia in excess may be blown away by directing simultaneously a strong current of an indifferent gas upon the water surface or by spraying in a reaction vessel simultaneously the ammoniacal solution and the water while carrying away the ammonia with a current of gas. In both cases, the removal of the ammonia may be facilitated by stirring the mixture or by application of heat. From the aqueous solution the remainder of ammonia may be expelled in a vacuum.

It is obvious that the mixing operations mentioned above, may be carried out in a vacuum; since the solubility of ammonia in water depends upon the pressure, higher concentrations of ammonia in the aqueous solution are easily avoided under these conditions. When mixing the ammoniacal solution with water in a vacuum vessel while thoroughly stirring, the entrance of the ammoniacal solution may be beyond or beneath the water surface. In order to avoid the formation of foam an anti-foam compound, for instance, a trace of a higher aliphatic alcohol may be added to the water.

The invention may be illustrated by the following example:—

Undegummed waste of mulberry silk is thoroughly freed from sericin by boiling it for 6 hours in a solution of neutral olive oil soap of 1 per cent strength. The soap bath is used in the ratio 1:25 and the vessel is heated by indirect steam. The soap bath is renewed thrice or four times, whereupon the liquid used in the second boiling operation is used in the known manner as the first boiling lye of the next batch of silk to be degummed. After having been boiled with soap solution, the silk is thoroughly washed with water, centrifuged and then boiled again for ½ hour with acetic acid of 2 per cent strength. The silk material thus degummed then is centrifuged again and carefully dried without washing at about 100° C.

850 parts of the fibroin thus pretreated, are introduced into a vessel provided with a stirrer and a cooling jacket and containing 7000 parts of liquid anhydrous ammonia of −77° C. After stirring for ½ hour, the clear thin-liquid, honey-colored solution is filtered through a fine-meshed sieve, for instance of nickel-gauze, whereupon the remainders of the pupae and other impurities are separated.

The ammoniacal fibroin solution thus obtained, is then slowly introduced into a vacuum vessel provided with a stirrer and containing 5500 parts of water with such a velocity that the whole solution is introduced into the vacuum vessel in about ½ hour. The vacuum maintained in the vessel, may correspond to about 35 mm. mercury. On the bottom of the vessel or on the stirrer, a piping is provided through which warm water is flowing keeping the temperature of the dissolving water in the vessel at about +5° C. during the entrance of the ammoniacal solution. The temperature may, however, fall somewhat below 0. In order to avoid the formation of foam, preferably a small quantity of a higher alcohol, for instance, octyl alcohol, is added to the water. After having introduced the ammoniacal solution, the vessel remains evacuated while stirring, for further 20 minutes, whereupon the solution contained therein may be warmed and the vacuum is raised to about 11 mm. mercury by diminution of the amount of ammonia present. When strictly maintaining the vacuum and the temperatures mentioned above, a clear weakly opalescent yellow aqueous solution of fibroin is obtainable showing a low viscosity. The solution contains about 15 per cent of fibroin and 0.1–0.2 per cent of ammonia. It may be concentrated to a solution containing up to 30 per cent of fibroin by the partial evaporation of the water in a vacuum.

The aqueous fibroin solutions thus obtained may be spun to form artificial threads by coagulating them in salt baths. They may be likewise worked up to form other articles similar in shape to those made in the viscose industry.

The accompanying drawing shows an apparatus in which the transformation of the ammoniacal fibroin solution into the aqueous solution may be carried out. A is a storage vessel containing the cooled ammoniacal fibroin solution well insulated against change of the temperature. B is the dissolving vessel provided with a stirrer C, a warm water jacket D surrounding the conical bottom of the vessel, and with an exit E combined with a vacuum machine and an ammonia recovery system (not shown). The liquid ammonia solution is introduced through a tube F likewise insulated, into the dissolving vessel B, partly filled with water, with the assistance of a vacuum applied at E. The aqueous solution obtained may be drawn off through the outlet G.

Various modifications and changes in details of construction and arrangement of parts are possible. Thus, the storage vessel A may be provided with a cooling device and with a stirrer and simultaneously serve as a container when dissolving the fibroin in cooled liquid ammonia. A sieve or filter may be arranged on the tube F at F', and a spraying nozzle at F".

Obviously, our invention is not limited to the foregoing example or to the details given therein. Thus, we may use, for instance, as a starting material an ammoniacal solution containing fibroin recovered from a known solution in strong mineral acids or in salt solutions. The waste of solid regenerated fibroin obtained when working up our aqueous solutions, likewise may be dissolved again in liquid ammonia and transformed into the aqueous solutions. All these possibilities are considered to be within the spirit of the invention and the scope of the following claims.

The term "liquid ammonia" or "liquid anhydrous ammonia", where it occurs in the specification and the following claims, is intended to comprise the liquefied gas corresponding to the formula $NH_3$ which, however, may contain such quantities of water unavoidable in the liquefaction when operated on a commercial scale. In the same manner the term "indifferent gas" is intended to include a gas which does not chemically react on ammonia nor injure the fibroin compound.

What is claimed is:

1. The process of making aqueous solutions of fibroin containing little or no electrolyte, which comprises dissolving fibroin in liquid ammonia, mixing the ammoniacal fibroin solution with water and removing the ammonia by evaporation.

2. The process of making aqueous solutions of fibroin containing little or no electrolyte, which comprises dissolving fibroin, of the kind produced by the mulberry silk-worm, in liquid ammonia, mixing the ammoniacal fibroin solution with water and removing the ammonia by evaporation.

3. The process of making aqueous solutions of fibroin containing little or no electrolyte, which comprises dissolving fibroin, of the kind produced by the mulberry silk-worm, in liquid ammonia at a temperature near the freezing point of ammonia, mixing the ammoniacal fibroin solution with water while maintaining a mixing temperature of about 45° C., and removing the ammonia by evaporation.

4. The process of making aqueous solutions of fibroin containing little or no electrolyte, which comprises dissolving fibroin, of the kind produced by the mulberry silk-worm, in liquid ammonia at a temperature near the freezing point of ammonia, mixing the ammoniacal fibroin solution with water while maintaining a mixing temperature of about +5° C., and removing the ammonia by evaporation at about ordinary temperature under a diminished pressure.

5. The process of making aqueous solutions of fibroin containing little or no electrolyte, which comprises dissolving fibroin, of the kind produced by the mulberry silk-worm, in liquid ammonia at a temperature near the freezing point of ammonia, spraying the ammoniacal fibroin solution in a closed vessel, allowing the sprayed solution to pass a substantial space in an indifferent gas, collecting the sprayed solution in water, and carrying away the bulk of ammonia in gaseous form by a current of an indifferent gas blown against the water surface while stirring the water.

6. The process of making aqueous solutions of fibroin containing little or no electrolyte, which comprises dissolving fibroin, of the kind produced by the mulberry silk-worm, in liquid ammonia at a temperature near the freezing point of ammonia, spraying the ammoniacal fibroin solution in a closed vessel, allowing the ammoniacal spray to meet a spray of water and carrying away the bulk of ammonia by a current of an inert gas blown through the vessel.

7. The process of making aqueous solutions of fibroin containing little or no electrolyte, which comprises dissolving fibroin, of the kind produced by the mulberry silk-worm, in liquid ammonia at a temperature near the freezing point of ammonia, introducing the ammoniacal fibroin solution into a vacuum vessel containing water, warming the solution and stirring it under diminished pressure.

8. A fibroin solution suitable for sizing, spinning, dressing or the like, consisting of anhydrous ammonia-treated fibroin, ammonia not in excess of 1%, and water.

9. A fibroin solution suitable for sizing, spinning, dressing or the like, said solution consisting of fibroin not exceeding about 30%, ammonia not exceeding about 1%, and water the remainder.

10. A solution consisting of from about 15% to about 30% of fibroin, from 0.1% to 0.2% of ammonia, and water the remainder.

11. A solution consisting of about 15% of fibroin, from 0.1% to 0.2% of ammonia, and water the remainder.

HEINRICH FINK.
ERNST ROSSNER.